United States Patent
Murasawa et al.

(10) Patent No.: US 8,308,312 B2
(45) Date of Patent: Nov. 13, 2012

(54) VEHICLE METER

(75) Inventors: Naoki Murasawa, Saitama (JP); Mizuho Asao, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 300 days.

(21) Appl. No.: 12/453,659

(22) Filed: May 18, 2009

(65) Prior Publication Data

US 2010/0002412 A1    Jan. 7, 2010

(30) Foreign Application Priority Data

Jul. 3, 2008 (JP) .................................. 2008-174937

(51) Int. Cl.
*G01D 11/28* (2006.01)

(52) U.S. Cl. ........................................... 362/23; 362/30

(58) Field of Classification Search ................ 362/5, 23, 362/97.3, 28–30; 340/815.45, 815.53
See application file for complete search history.

(56) References Cited

U.S. PATENT DOCUMENTS

| | | | | |
|---|---|---|---|---|
| 2,108,342 A * | 2/1938 | Le Fevre | ...................... | 116/62.1 |
| 5,710,545 A * | 1/1998 | Dunn | ........................ | 340/815.45 |
| 6,017,127 A * | 1/2000 | Kurple | ............................. | 362/29 |
| 7,275,497 B2 * | 10/2007 | Kato | ............................... | 116/304 |
| 7,562,993 B2 * | 7/2009 | Pala et al. | ........................ | 362/23 |
| 8,021,033 B2 * | 9/2011 | Tokita et al. | ................... | 362/615 |
| 2002/0001183 A1 * | 1/2002 | Shigehiro | ........................ | 362/23 |
| 2004/0228104 A1 * | 11/2004 | Birman | ............................ | 362/23 |
| 2007/0052875 A1 * | 3/2007 | Suzuki et al. | ...................... | 349/1 |
| 2008/0151525 A1 * | 6/2008 | Kato | ............................... | 362/29 |

FOREIGN PATENT DOCUMENTS

| | | | |
|---|---|---|---|
| JP | 08-128865 | | 5/1996 |
| JP | 409033292 A | * | 2/1997 |

* cited by examiner

*Primary Examiner* — Julie Shallenberger
(74) *Attorney, Agent, or Firm* — Squire Sanders (US) LLP

(57) ABSTRACT

A vehicle meter is provided including a dial 10 and light sources provided on the rear face of the dial. A plurality of characters can be arranged on the dial and can be displayed by transmitting light from the light sources (a plurality of LEDs 25) and formed differently from each other in amount of transmitted light. The characters arranged on the dial may be provided with an increased and decreased amount of transmitted light to improve the visibility of the character intended to be emphasized. This makes it easy to visually recognize the entire string of characters in the vehicle meter.

17 Claims, 5 Drawing Sheets

VEHICLE METER

BACKGROUND

1. Field

Embodiments of the present invention relate generally to a vehicle meter, such as a speed meter, a tachometer, etc., mounted on a vehicle. In particular, embodiments of the invention may relate to a vehicle meter that can be mounted on a motorcycle, and that achieves an improvement in twilight or nighttime visibility of characters, such as numerals, arranged on a dial of the vehicle meter.

2. Description of the Related Art

A vehicle meter mounted on a motorcycle is configured, by way of example, to include a dial and a light source provided on the back face of the dial as described in the conventional art of Japanese Patent Laid-open No. Hei 8-128865. The dial of the vehicle meter includes a base plate formed of a light-shielding plate and a transmissive portion shaping characters such as numerals arranged on the base plate. With the vehicle meter configured as above, during nighttime traveling, light emitted from the light source passes through the transmissive portion from the rear side of the dial so that the characters are visually recognized from the view point of an operator mounting on the vehicle.

If the vehicle meter configured as above uses a white dial, the characters are displayed with transmitted light passing through the characters (the transmissive portion) arranged on the white dial. However, deformation of the characters occurs due to outside light reflected from the white dial and to glare of the transmitted light. Thus, it is relatively difficult to visually recognize the characters drawn on the white dial from the riding view point in some cases.

In particular, compared with four-wheel vehicles arranged with a meter in the compartment, two-wheel vehicles with a meter exposed to the outside are very significantly affected by outside light. Thus, it is probable that it is difficult to visually recognize light passing through the characters of the dial in the twilight, namely, under dim outside light, under the freeway lightings in the United States, or under sodium lightings used as in-tunnel illumination.

It is sometimes possible to deal with such a case by modifying the dial into blackish colors, for example, or by adding edging to characters. However, the recent motorcycles have harmoniously designed under a single concept including vehicle design. Therefore, even if the color of the dial of the vehicle meter which is part of the concept is modified, the designer's target for the type cannot frequently been achieved.

SUMMARY

According to one embodiment of the invention, a vehicle meter is provided. The vehicle meter may comprise a dial having a plurality of characters arranged thereupon, and a light source provided on a rear face of the dial. The characters are displayed by transmitting light from the light source. Different characters may be provided with a varying amount of transmitted light and a character with a small amount of transmitted light may be arranged between characters with a large amount of transmitted light.

According to another embodiment of the invention, a method is provided. The method comprises providing a dial on a vehicle meter, said dial comprising a plurality of characters arranged thereupon. The method may further include providing a light source on a rear face of the dial, displaying the characters by transmitting light from the light source, and controlling an amount of transmitted light to each of the plurality of characters. A character with a small amount of transmitted light may be arranged between characters with a large amount of transmitted light.

According to another embodiment of the invention, a vehicle meter is provided. The vehicle meter may comprise first providing means for providing a dial on a vehicle meter, said dial comprising a plurality of characters arranged thereupon. The vehicle meter may further comprise second providing means for providing a light source on a rear face of the dial, displaying means for displaying the characters by transmitting light from the light source, and controlling means for controlling an amount of transmitted light to each of the plurality of characters. A character with a small amount of transmitted light is arranged between characters with a large amount of transmitted light.

BRIEF DESCRIPTION OF THE DRAWINGS

For proper understanding of the invention, reference should be made to the accompanying drawings, wherein.

DETAILED DESCRIPTION

An embodiment of a vehicle meter according to the present invention will hereinafter be described with reference to the drawings.

A vehicle meter may be provided, for example, on the upper portion of a steering device attached to the front side of a motorcycle.

Figure 1:
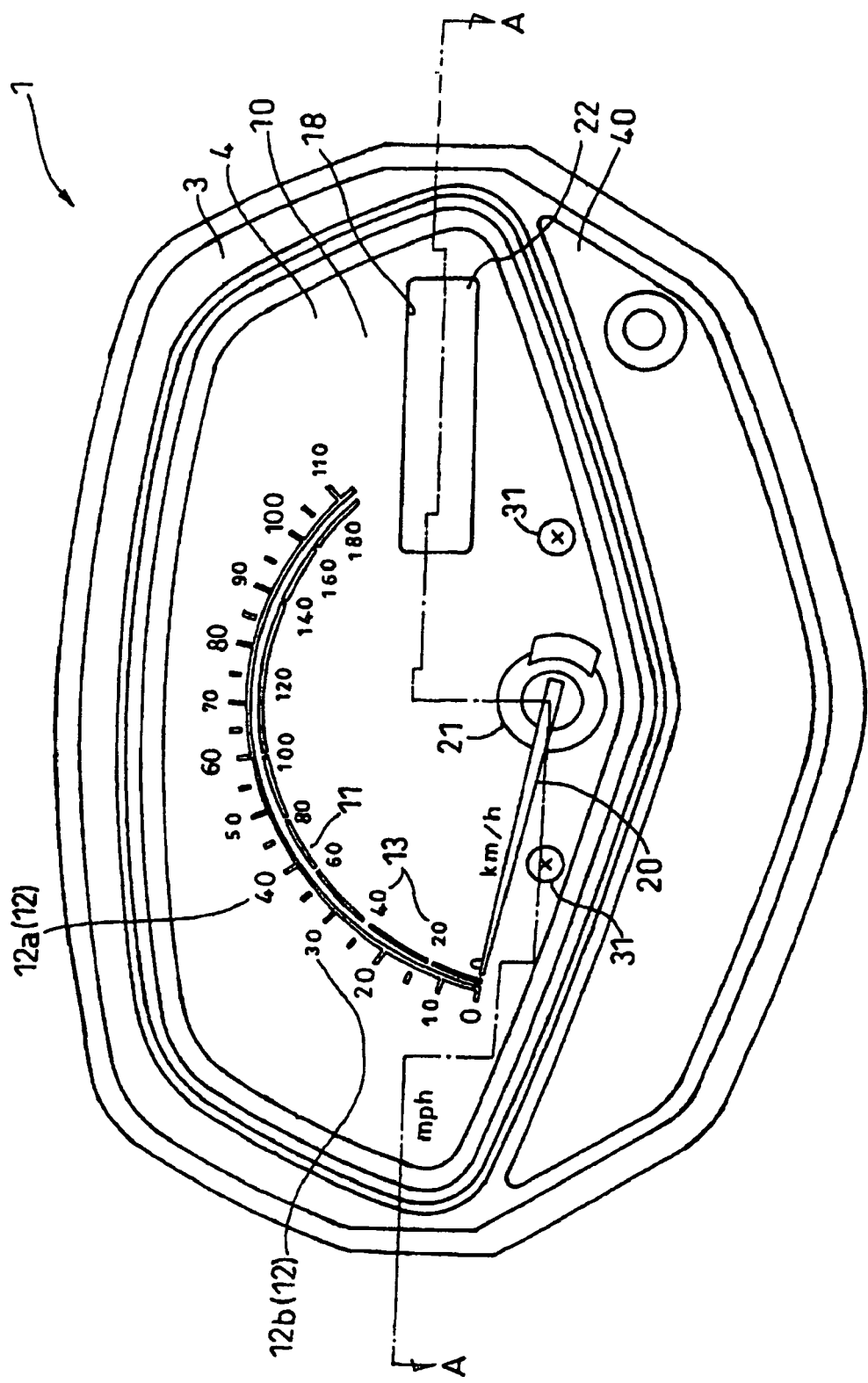
FIG. 1 is an explanatory plan view of a vehicle meter according to an embodiment of the present invention.
Figure 2:
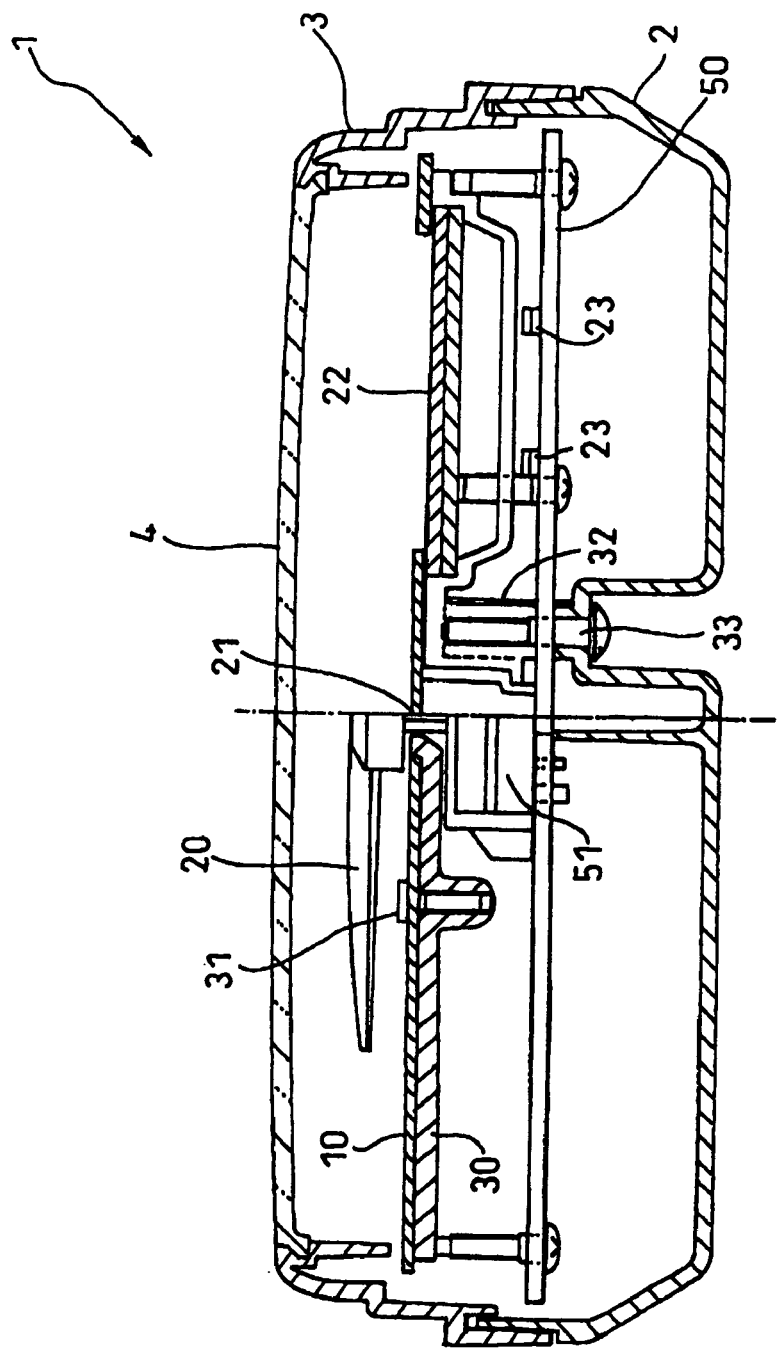
FIG. 2 is an explanatory cross-sectional view of the vehicle meter taken along line A-A of FIG. 1 according to an embodiment of the present invention.

Referring to FIGS. 1 and 2, the vehicle meter 1 may include a lower case 2 integrally formed of resin or the like to have an attachment portion (not illustrated) for the steering device. An upper case 3 may be secured to cover the lower case 2, and a dial 10 may be provided on which characters such as numerals indicating speed, or other vehicle-related measurements, are displayed. A support plate 30 can be used to support the dial 10, and light sources, such as LEDs, can be provided on the back surface of the dial 10 and support plate 30. The upper surface of the upper case 3 may be formed of a resinous transparent cover 4 so that the characters of the dial 10 can visually be recognized from outside.

The dial 10 may be such that a light-shielding print material having a whitish color as the dial color is printed, in a stratified manner, on the rear face of its substrate excluding a portion corresponding to a graduation portion 11 and a pattern display portion such as characters 12, 13, etc. In addition, a black print material can be laminated on the pattern display portion so as to cover the light-shielding print material and to have a translucent structure. The substrate may be formed of a transparent acrylic material or the like. In this way, if the dial 10 is viewed from the front side, arranged on the front face of the whitish dial is a fan-like black graduation portion 11, mile (mph)-display black numerals 12 on the upper side of the graduation portion 11, and kilo (km/h)-display black numerals 13 on the lower side of the graduation portion 11.

Figure 3:
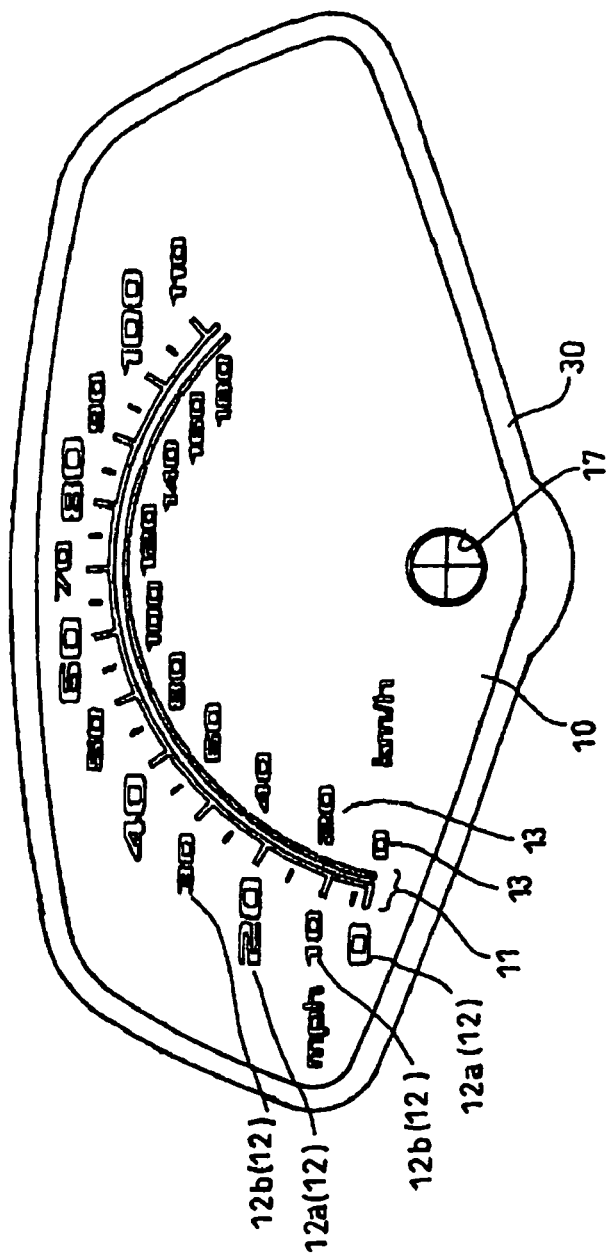
FIG. 3 is an explanatory plan view for assistance in explaining a dial and support panel portion used in the vehicle meter according to an embodiment of the present invention.

In the dial 10 illustrated in FIGS. 1 and 3, the numerals 12, 13 and the graduation portion 11 may be designed to transmit light emitted from the light sources for character display. Specifically, the black portions of the numerals and of the graduation portion (in FIG. 3, the areas internally edging the numerals and the graduation portion) can be formed such that the transmissive portions (see-through portions) and the light-shielding portions formed with black ink exist in a mixed or alternating manner. In addition, light emitted from the light sources installed on the rear side of the dial can pass through the transmissive portions to shape the characters, etc. In such a configuration, the numerals and graduation portions can visually be recognized by the vehicle operator during nighttime travel.

Figure 4:
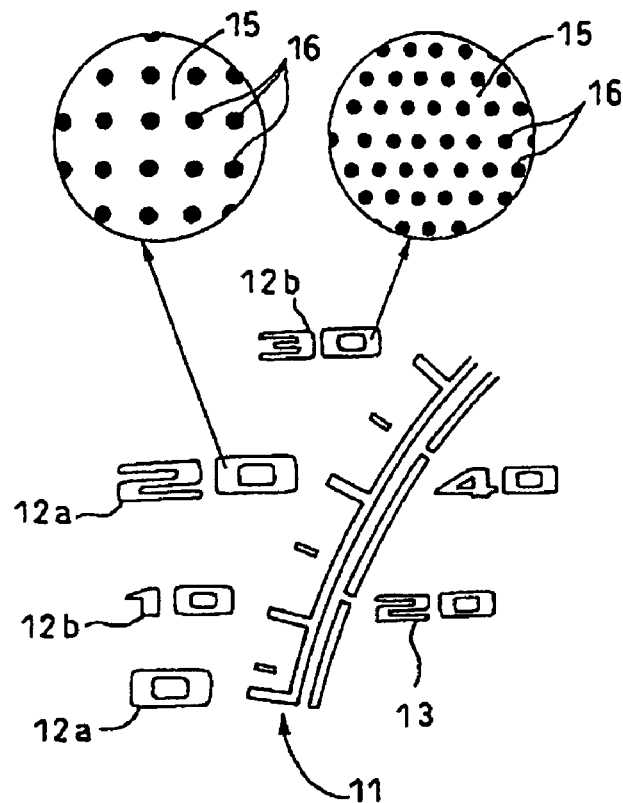
FIG. 4 is an explanatory plan view of the partially expanded dial including characters according to an embodiment of the present invention.

The mile (mph)-display numerals 12 on the upper side in the dial 10 can be configured such that the font sizes (dimensions) of adjacent numerals are made different from each other and the amounts of light passing through the characters are alternately increased and decreased. Specifically, for example, numerals "0," "20," "40," "60," "80" and "100" are indicated with large letters/numerals or font size 12a, whereas "10," "30," "50," "70" and "110" are indicated with small letters/numerals or font size 12b. In addition, as illustrated in FIG. 4, the large letters/numerals 12a and the small letters/numerals 12b are made different from each other in the area transmitting light from the light source to increase and decrease the amounts of light passing through the large letters/numerals 12a and the small letters/numerals 12b, respectively. This enhances the visibility of the large letters/numerals 12a.

More specifically, in one embodiment, the large letters/numerals 12a and the small letters/numerals 12b formed on the dial 10 can each be formed to have an area where the light-shielding white ink is not printed. This area may be configured to include a see-through portion 15 with translucency and a plurality of fine dots 16 printed from the rear side with a black print material in the see-through portion 15. When being printed, the fine dots 16 are varied in size and in density to adjust the area of the see-through portion 15, thereby increasing or decreasing the amount of transmitted light. For instance, the large letters/numerals 12a may be made larger than the small letters/numerals 12b in the area of the see-through portion 15 per unit area.

Figure 5:
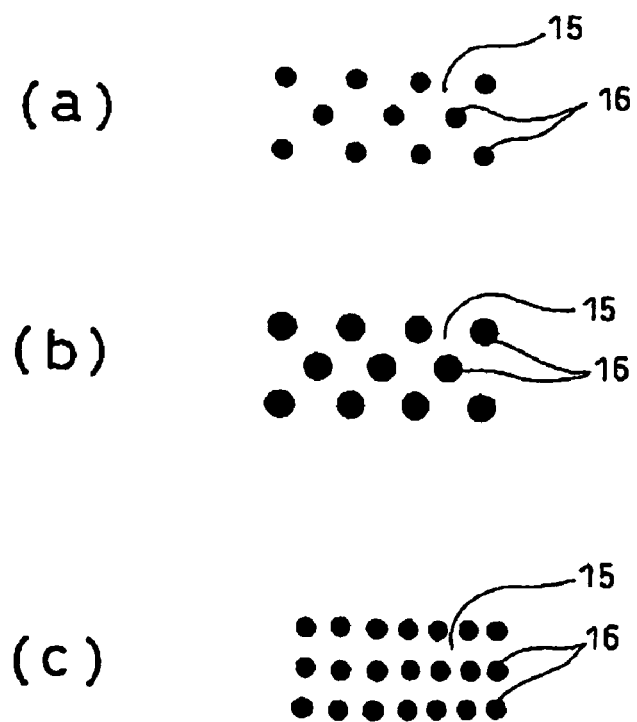
FIGS. 5(*a*), (*b*) and (*c*) are schematic views for assistance in explaining the configuration of the character portion displayed on the dial according to an embodiment of the present invention.

For example, in the case where the fine dots 16 are printed in the see-through portion 15 at a rate as illustrated in FIG. 5(a) and the size of the fine dots 16 is made larger at the same density as illustrated in FIG. 5(b), the area of the see-through portion 15 is reduced. In other words, the small letters/numerals 12b (FIG. 5(b)) can be made smaller in the amount of transmitted light than the large letters/numerals 12a (FIG. 5(a)).

Alternatively, as illustrated in FIG. 5(c), even if the size of the printed fine dots 16 is the same, the density thereof may be made higher to reduce the area of the see-through portion 15. In such a case, the small letters/numerals 12b (FIG. 5(c)) can be made smaller in the amount of transmitted light than the large letters/numerals 12a (FIG. 5(a)).

When the fine dots 16 are printed with the black print material on the rear face of the dial 10, to change the size and density of the fine dots 16, the area of the large letters/numerals 12a or of the small letters/numerals 12b may be formed so as to be covered by a corresponding one of different layers (for example, masks formed with apertures different in the size and density of the fine dots 16 are used to print the black print material).

In the embodiments as described above, the fine dots 15 printed to form the large letters/numerals 12a and the small letters/numerals 12b are shaped in circle; however, they may be formed in any shape such as rectangle, triangle or the like.

As illustrated in FIG. 3, the dial 10 may be provided at a central lower portion with a circular opening 17 configured to receive a shaft 21 of a meter-pointer 20 inserted therethrough.

As illustrated in FIG. 2, the dial 10 can be secured to the support plate 30 supporting the circumferential edge portion of the dial 10 by means of screws 31 from the front side, and can be secured to the lower case 2 by means of screws 33 attached to a stay 32 provided on the rear side of the support plate 30 to project therefrom.

A liquid crystal display (LCD) 22 may be secured to the support plate 30 so that a display section faces an opening window 18 provided in the dial 10. The liquid crystal display 22 can be configured to include a liquid crystal display section configured to digital-display travel distance, etc. Backlight light emitting diodes (LEDs) 23 are disposed below the liquid crystal display 22.

A warning section 40 may be formed below the dial 10 of the vehicle meter 1 with a plurality of warning lamps (not shown) in a generally V-shaped region as shown in FIG. 1. The warning section 40 can be configured to light the warning lamps to inform an operator of various pieces of information on the vehicle, such as a neutral position of a gear, low fuel warning, oil temperature warning, low oil warning, high-beam, etc., at the time of engine starting or during travel of the vehicle. Turn signal lamps (not shown) operated by the operator when the vehicle is turned to the left or right can be provided in the warning section 40. The upper surface of the warning section 40 may be covered by a plastic-made smoke cover with translucency.

Figure 6:
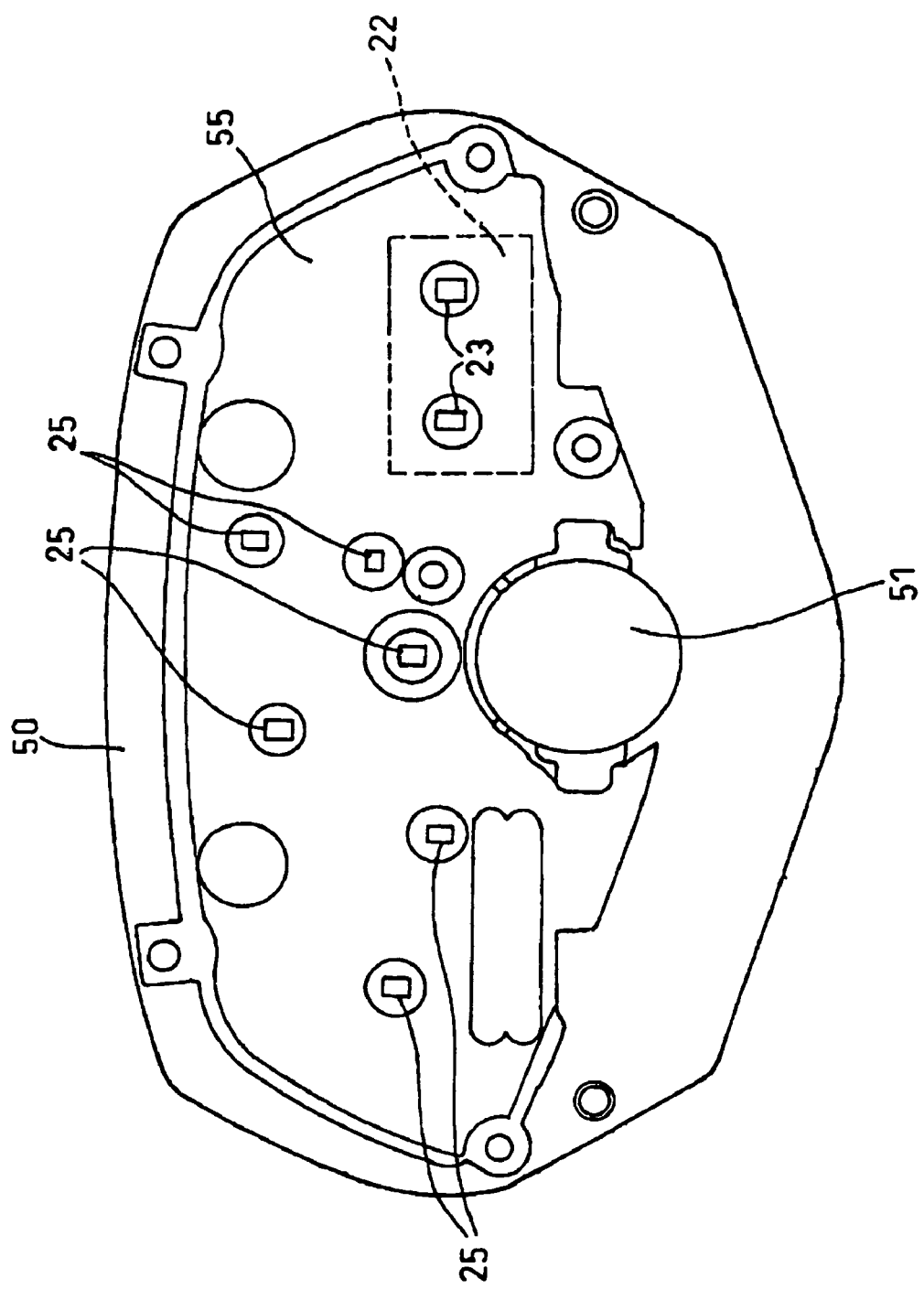
FIG. 6 is an explanatory plan view of a circuit board used in the vehicle meter according to an embodiment of the present invention.

As shown in FIG. 2, a circuit board 50 may be secured between the lower case 2 and the support plate 30. Referring to FIG. 6, the above-mentioned backlight LEDs 23 and a plurality of LEDs 25 serving as light sources of light passing through the characters 12, 13 and graduation portion 11, and as vehicle meter illumination, may be formed at respective desired positions in a printed wiring area 55 formed in the circuit board 50. The LEDs (light-emitting diodes) serving as the light sources for vehicle meter illumination may be designed to emit reddish light.

Since the light sources are formed of the plurality of LEDs (light-emitting diodes) 25, uniform transmitted light is given to the characters 12, 13 and the graduation portion 11 arranged in the wide range of the dial 10. In addition, the use of the LEDs can reduce electric power consumption.

The warning lamps of the warning section 40 can be configured to light various colors, i.e. red (low fuel warning and the like), green (gear neutral position), blue (high-beam), and orange (turn signal), depending on the kinds of information to be displayed.

The shaft 21 of the meter pointer 20 may be inserted into the circular opening 17 located at the center of the dial 10. The shaft 21 can be connected to a shaft of a movement 51 secured to the circuit board 50. In response to a signal inputted to the movement 51 resulting from detected vehicle speed, the meter-pointer 20 may be moved above the graduation portion 11 of the dial 10.

With the vehicle meter 1 configured as above, the character display may be performed by the reddish transmitted light passing through the graduation portion 11 and the numerals 12, 13 arranged on the whitish dial 10. The large letters/numerals 12a and the small letters/numerals 12b corresponding to the respective numerals indicated in mile (mph) in the dial 10 are designed such that the adjacent characters are made different from each other in the amount of transmitted light. Thus, deformation of the characters can be prevented from occurring due to outside light reflected from the dial 10 and to glare of transmitted light. This can improve the visibility of the characters (the large letters/numerals 12a) that are intended to be emphasized. Consequently, it is possible to make it easy to visually recognize the entire string of characters in the vehicle meter 1, which makes it easy to make out the information issued by the vehicle meter 1.

The large letters/numerals 12a with a large amount of transmitted light may be displayed in large font size, whereas the small letters/numerals 12b with a small amount of transmission light may be displayed in small font size. The visibility of the characters can be made different from each other in degree to further improve the visibility of the characters intended to be emphasized.

The dial 10 of the vehicle meter 1 configured as above can be such that the large letters/numerals 12a and the small letters/numerals 12b are displayed in the same font type. However, the character displayed in large font size and that in small font size may be made different from each other to make it easy to make out the characters.

In the embodiment described above, the dial 10 can be formed in a whitish color and light emitted from the light sources (the LEDs 25) can be made to have a reddish color. This confirms the satisfactory visibility of transmitted light when the character display is performed in the whitish dial 10 by light passing therethrough. However, even if the dial 10 has a color other than whitish colors, such as black, and it can be assumed that the dial reflects outside light from the dial because of containing metallic particles or pearl particles, the adoption of the configuration of the present invention can make the visibility of the transmitted light satisfactory. In addition, light emitted from the light source may not be limited to reddish colors but light of other colors may also be used.

The above-embodiments describe examples in which the invention is applied to the vehicle meter to be mounted on a motorcycle. However, the structure of the invention can be adopted as a vehicle meter for four-wheel vehicles, etc. in which a speed meter, a tachometer, etc. are arranged in its compartment.

In view of the embodiments outlined above, a vehicle meter can be provided with a structure that can ensure more satisfactory visibility relative to characters arranged on a dial through transmitted light even in the twilight or under sodium lights. Therefore, the flexibility of setting color of a dial and of selecting font design can be increased to facilitate the productization of vehicles having a concept intended by a designer.

Thus, according to one embodiment, a vehicle meter may be provided that includes a dial, and a light source provided on a rear face of the dial. A plurality of characters arranged on the dial can be displayed by transmitting light from the light source, and the characters can be made different from each other in an amount of transmitted light and a character with a small amount of transmitted light may be arranged between characters with a large amount of transmitted light.

According to another embodiment, the vehicle meter includes characters that can be arranged such that adjacent characters have a given difference therebetween in the amount of transmitted light.

According to another embodiment, the vehicle meter may include characters such that a character with a large amount of transmitted light is displayed in large font size, whereas a character with a small amount of transmitted light is displayed in a small font size.

According to another embodiment, the vehicle meter may include characters such that the character displayed in large font size is different in font from that in small font size.

According to another embodiment, the vehicle meter may include a dial that is formed in a whitish color and the light emitted from the light source is made reddish.

According to another embodiment, the vehicle meter may include a light source that is formed of a plurality of light-emitting diodes.

According to another embodiment, the vehicle meter may be used in a motorcycle.

Thus, according to embodiments of the present invention, the characters arranged on the dial are increased or decreased in amount of transmitted light. Therefore, while the electric power consumption of the light source is not increased, that is, remains unchanged, visibility of a character intended to be emphasized can be improved.

According to another embodiment, the adjacent characters are made to have a difference therebetween in amount of transmitted light. Therefore, in the string of characters, characters intended to be improved in visibility and emphasized can alternately be arranged.

According to a further embodiment, the character with a large amount of transmitted light is displayed in large font size, whereas a character with a small amount of transmitted light is displayed in small font size. Therefore, the visibility of the characters can further be made different in degree from each other.

According to another embodiment, the character displayed in large font size is different in font from that in small font size. Therefore, embodiments of the invention are further able to distinguish the characters from each other.

According to another embodiment, if the dial is formed in whitish colors, light emitted from the light source is made reddish. Therefore, the visibility of transmitted light can be made satisfactory when the character display is performed in the whitish dial by light passing therethrough.

According to a further embodiment, the light source may be formed of a plurality of light-emitting diodes. Therefore, uniform transmitted light is given to the characters arranged in the wide range of the dial. In addition, electric power consumption can be reduced.

According to another embodiment, the vehicle meter may be used in a motorcycle without a roof, and a degradation in visibility can be prevented where the vehicle meter or dial is susceptible to an influence of outside light.

DESCRIPTION OF REFERENCE NUMERALS

1: Vehicle meter
2: Lower case
3: Upper case
4: Transparent cover
10: Dial
11: Graduation portion
12: Numeral
12a: Capital letter
12b: Small letter
13: Numeral
15: See-through portion
16: Fine dot
20: Meter pointer 22: Liquid crystal display
23: LED (for backlight)
25: LED (for light source)
30: Support panel
40: Warning section
50: Circuit board
55: Printed wiring area

We claim:

1. A vehicle meter, comprising:
a dial comprising a plurality of characters arranged thereupon and a graduation portion, wherein the characters comprise numerals; and
a light source provided adjacent a rear face of the dial;
wherein the characters and graduation portion are displayed by transmitting light from the light source,
wherein different characters transmit a varying amount of the light transmitted from the light source,
wherein one of the numerals with a small amount of transmitted light is arranged between and adjacent to numerals with a large amount of transmitted light, and
wherein the dial comprises areas internally edging the numerals and the graduation portion comprise a translucent portion and a light-shielding portion arranged in an alternating manner, the light-shielding portion formed with black ink.

2. The vehicle meter according to claim 1, wherein the dial is configured such that characters immediately adjacent to each other have a given difference therebetween in the amount of transmitted light.

3. The vehicle meter according to claim 2, wherein the dial is configured such that a character with a large amount of transmitted light is displayed in large font size and a character with a small amount of transmitted light is displayed in small font size.

4. The vehicle meter according to claim 3, wherein the dial is configured such that the character displayed in the large font size is different in font from the character displayed in the small font size.

5. The vehicle meter according to claim 1, wherein the dial has a white color and the light emitted from the light source is red.

6. The vehicle meter according to claim 1, wherein the light source comprises a plurality of light-emitting diodes.

7. The vehicle meter according to claim 1, wherein the vehicle meter is included in a motorcycle.

8. A method, comprising:
providing a dial on a vehicle meter, said dial comprising a plurality of characters arranged thereupon and a graduation portion, wherein the characters comprise numerals;
providing a light source adjacent a rear face of the dial;
displaying the characters and graduation portion by transmitting light from the light source; and
controlling an amount of light transmitted through each of the plurality of characters,
wherein one of the numerals with a small amount of transmitted light is arranged between and adjacent to numerals with a large amount of transmitted light, and
wherein the dial comprises areas internally edging the numerals and the graduation portion comprise a translucent portion and a light-shielding portion arranged in an alternating manner, the light-shielding portion formed with black ink.

9. The method according to claim 8, further comprising controlling the amount of transmitted light such that characters immediately adjacent to each other have a given difference therebetween in the amount of transmitted light.

10. The method according to claim 9, further comprising configuring the characters such that a character with a large amount of transmitted light is displayed in large font size and a character with a small amount of transmitted light is displayed in a small font size.

11. The method according to claim 10, wherein the configuring comprises configuring the characters such that the character displayed in the large font size is different in font from the character displayed in the small font size.

12. The method according to claim 8, further comprising forming the dial in a white color, and wherein the light emitted from the light source is red.

13. The method according to claim 8, wherein said providing of the light source comprises providing a plurality of light-emitting diodes.

14. The method according to claim 8, further comprising mounting the vehicle meter on a motorcycle.

15. A vehicle meter comprising:
displaying means for displaying a plurality of characters on a vehicle meter and for displaying a graduation portion, wherein the characters comprise numerals arranged on the vehicle meter; and
transmitting means for transmitting light, the transmitting means adjacent a rear face of the displaying means,
wherein the characters and graduation portion are displayed by light transmitted from the transmitting means; and
controlling means for controlling an amount of light transmitted through each of the plurality of characters,
wherein one of the numerals with a small amount of transmitted light is arranged between and adjacent to numerals with a large amount of transmitted light, and
wherein the vehicle meter comprises areas internally edging the numerals and the graduation portion comprise a translucent portion and a light-shielding portion arranged in an alternating manner, the light-shielding portion formed with black ink.

16. The vehicle meter according to claim 1, wherein the dial comprises a translucent portion including a plurality of dots printed from the rear face of the dial with a black print material, wherein the plurality of dots have varying size and density to adjust an area of the translucent portion in order to increase or decrease the amount of transmitted light, and wherein, when the size and/or the density of the plurality of dots is increased, the area of the translucent portion is decreased.

17. The method according to claim 8, wherein the providing of the dial comprises providing a dial comprising a translucent portion including a plurality of dots printed from the rear face of the dial with a black print material, wherein the plurality of dots have varying size and density to adjust an area of the translucent portion in order to increase or decrease the amount of transmitted light, and wherein, when the size and/or the density of the plurality of dots is increased, the area of the translucent portion is decreased.

* * * * *